United States Patent [19]
Engwall

[11] Patent Number: 5,746,553
[45] Date of Patent: May 5, 1998

[54] DUAL PURPOSE LAY-UP TOOL

[75] Inventor: Dwight L. Engwall, Wichita, Kans.

[73] Assignee: The Boeing Company, Seattle, Wash.

[21] Appl. No.: 629,120

[22] Filed: Apr. 8, 1996

[51] Int. Cl.$^6$ .................................................. B23C 9/00
[52] U.S. Cl. ...................... 409/132; 409/138; 409/197; 409/219; 156/245
[58] Field of Search ..................... 409/132, 137, 409/138, 191, 197, 219, 202; 156/285, 245, 244.27, 244.12, 244.18, 267, 155, 196, 224, 353, 382, 510

[56] References Cited

U.S. PATENT DOCUMENTS

| | | | |
|---|---|---|---|
| 4,468,160 | 8/1984 | Campbell, Jr. | 409/202 |
| 4,664,737 | 5/1987 | Schlosstein | 156/285 |
| 4,680,216 | 7/1987 | Jacaruso . | |
| 4,786,351 | 11/1988 | Elliott et al. | 156/285 X |
| 4,795,518 | 1/1989 | Meinel et al. | 156/285 |
| 4,867,829 | 9/1989 | Moriya et al. | 156/285 |
| 4,907,479 | 3/1990 | Nasu | 156/382 X |
| 4,913,639 | 4/1990 | Wheeler . | |
| 5,071,503 | 12/1991 | Berman | 156/267 X |
| 5,126,000 | 6/1992 | Takai et al. | 156/285 |
| 5,145,297 | 9/1992 | McGrath, Jr. | 409/137 X |
| 5,242,523 | 9/1993 | Willden et al. . | |
| 5,248,551 | 9/1993 | Kelman et al. . | |
| 5,411,688 | 5/1995 | Morrison et al. | 156/245 X |
| 5,413,661 | 5/1995 | Spengler et al. | 156/245 X |

FOREIGN PATENT DOCUMENTS

| | | |
|---|---|---|
| 0 465 754 A2 | 1/1992 | European Pat. Off. . |
| 295 07 068.4 | 9/1995 | Germany . |

*Primary Examiner*—Daniel W. Howell
*Assistant Examiner*—Henry W. H. Tsai
*Attorney, Agent, or Firm*—J. Michael Neary

[57] ABSTRACT

A method of manufacturing a laid-up, bonded and, cured composite part, includes filling a groove on a facing surface of a tool with a foaming, self-skinning sacrificial material and covering the facing surface of the tool with a caul sheet. The tool is heated to cure the foaming material, filling the groove and forming a hard, smooth surface skin on the foam, flush with the facing surface of the tool. A series of plies are laid-up on the facing surface of the tool to form a tool-side skin, and other components of the part are laid-up on top of the tool-side skin plies. An adhesive/resin matrix is coated on or pre-impregnated into the skin plies and the components for bonding/curing to create a rigid integral assembly of the skin and components. A vacuum bag is applied over the laid-up skin and components and is sealed to peripheral regions of the facing surface of the tool around the laid-up skin and components. Air is evacuated from under the vacuum bag to cause air pressure outside the vacuum bag to press the vacuum bag against the components. The adhesive/resin matrix is bonded/cured to transform the skin and components into the rigid integral assembly. The vacuum bag is removed from the facing surface of the tool, uncovering the rigid integral assembly. The tool is fixed in a known position on a CNC machine tool bed to position the facing surface of the tool at a known position for edge routing of the rigid integral assembly by a machine tool. A cutter of the machine tool is guided on a predetermined path around the facing surface of the tool, with the cutter extending into the groove below the facing surface of the tool and cutting a peripheral edge around the rigid integral assembly. After edge routing, the rigid integral assembly is a finished part and is removed from the from the facing surface of the tool.

25 Claims, 8 Drawing Sheets

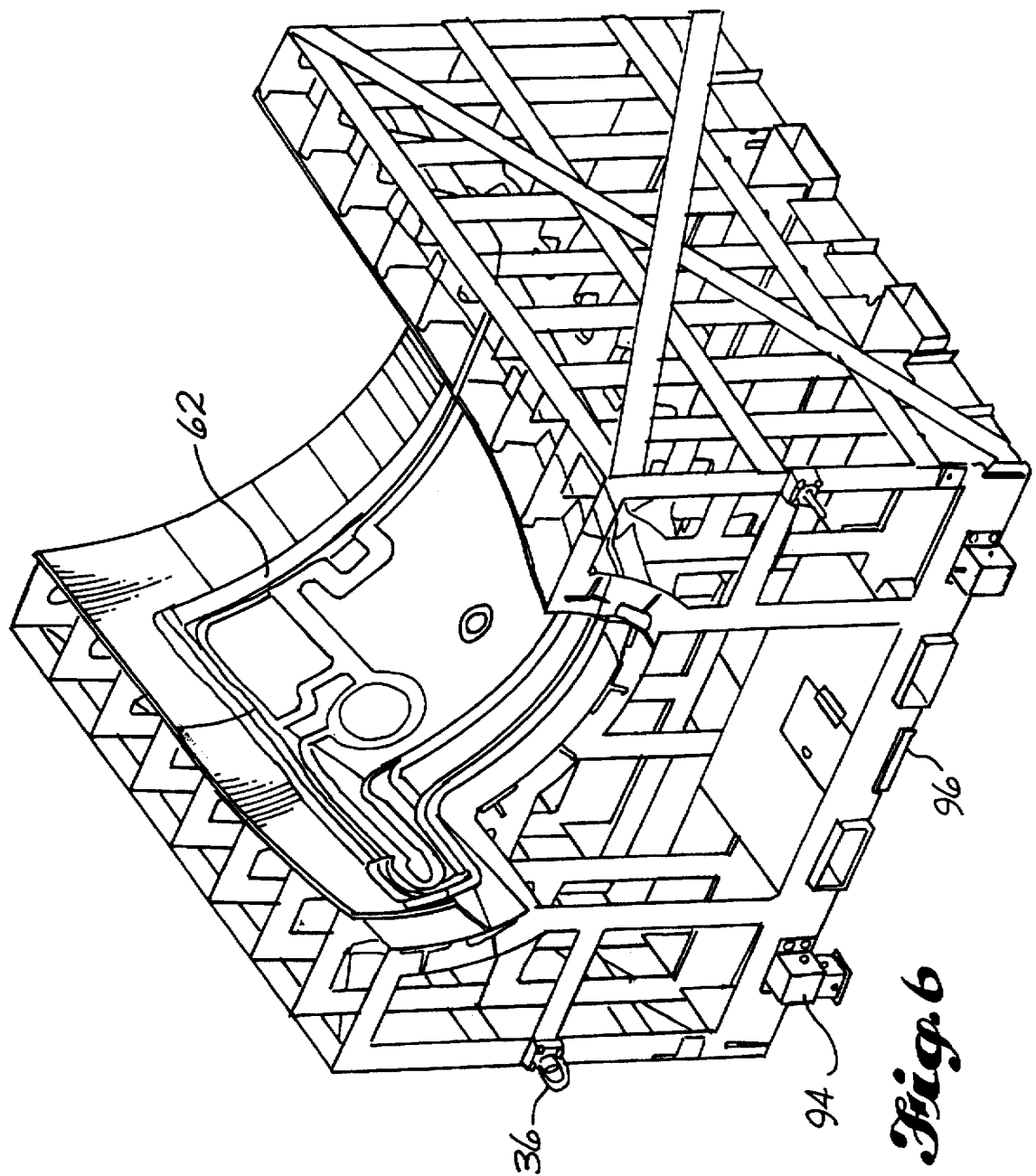

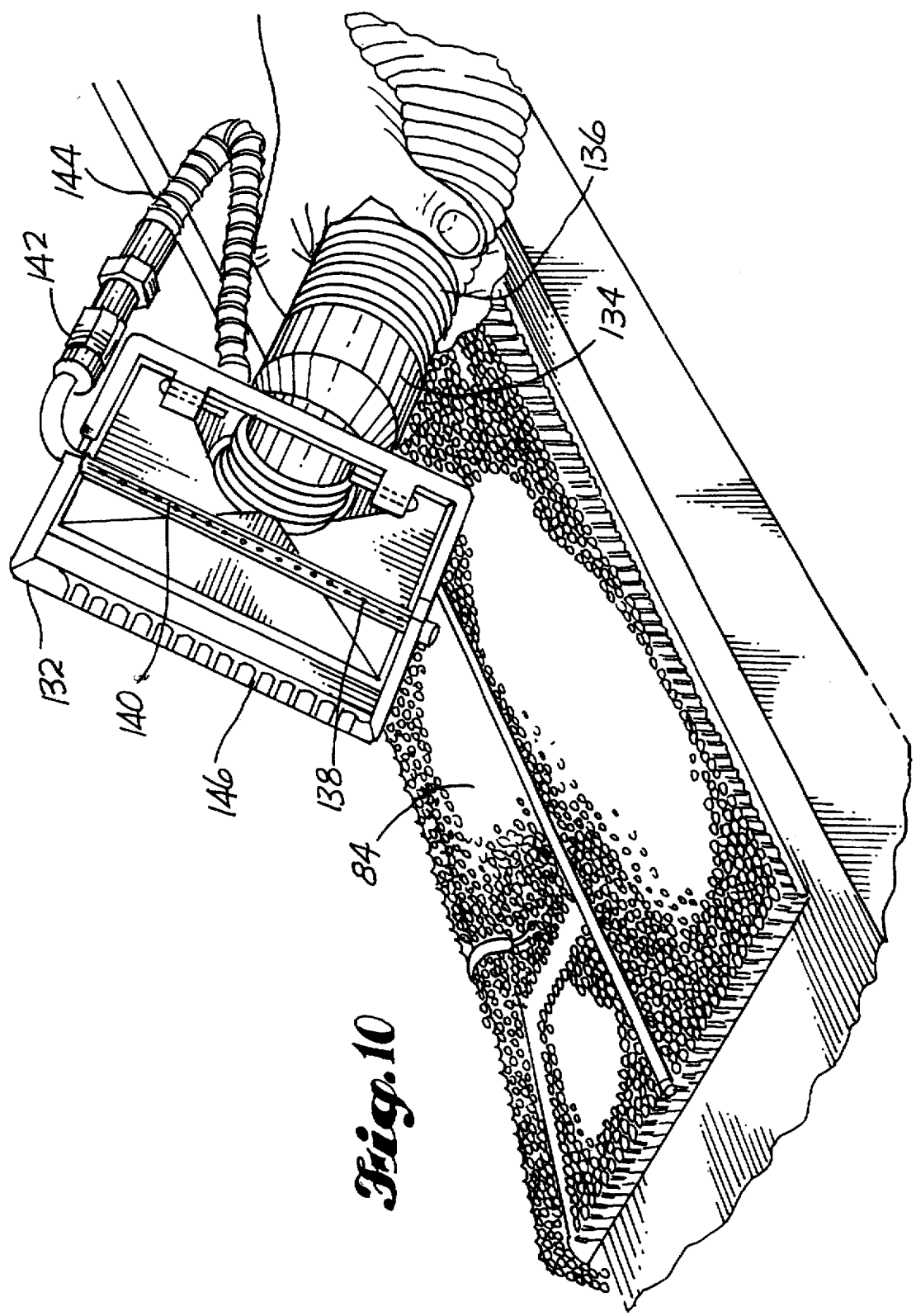

5,746,553

DUAL PURPOSE LAY-UP TOOL

This invention pertains to lay-up tools on which composite parts are made, and more particularly to lay-up tools on which honeycomb core sandwich parts can be laid up, the core bonded to the first face sheet and sculpted, the second face sheet applied and bonded, and the part trimmed, all without removing the part from the tool until it is finished.

BACKGROUND OF THE INVENTION

Composite parts have become commonly used throughout industry because of their engineering qualities and low weight. In particular, honeycomb composite parts having a honeycomb core bonded between two composite face sheets provide excellent strength and stiffness to weight ratios that make them particularly valued and widely used in the aerospace industry. However, despite the recognized benefits of this type of parts and their wide use, they are relatively expensive, in part because the manufacturing processes for producing these parts remain clumsy and difficult to use, contributing high reject and rework rates for composite parts.

The process for making composite parts includes laying up a tool-side skin, usually several plies of resin-impregnated fiberglass or graphite cloth, on the surface of a tool known as a "bond assembly jig" or BAJ. If the part is to have a honeycomb core, the honeycomb material is cut and fitted onto the tool-side skin and the assembly is covered with a vacuum bag from which the air is withdrawn with a vacuum source. The bagged assembly is inserted into an autoclave and reconnected to the vacuum source while it is heated to cure the resin in the tool-side skin plies and bond the honeycomb to the skin. The bagged assembly is removed from the autoclave and unbagged.

The part must now undergo a machining operation to shape the honeycomb core to the desired configuration. The machining is performed by an CNC machine tool such as a gantry mounted robot, but this machining operation cannot be performed with the part on the BAJ because it has no means for indexing it to a machine bed, and there are no provisions for holding the lay-up assembly on the tool face of the BAJ. More importantly, there is no relief in the tool face into which the cutters can project when edge routing, drilling, or other cutting operations. Instead, the part is broken out of the BAJ, and transferred to another tool known as a "bond mill fixture" or BMF. The BMF is designed to have the same profile as the BAJ and is provided with vacuum ports and hold down mechanisms intended to hold the part in place on the BMF while the honeycomb core material is machined to sculpt it to the desired shape.

The part is removed from the BMF and the honeycomb is cleaned to remove dust from the cells. The cleaned part is repositioned onto the BAJ where it is reattached with clamps and hold-down devices. The plies that will make up the bag-side skin are laid over the honeycomb core and are recovered with another vacuum bag. The BAJ is reinserted back into the autoclave where the bag-side skin is bonded to the honeycomb core. After cure, the cured part is again removed from the BAJ and repositioned onto the BMF for final trim.

This process is time consuming and costly. It requires the use of two separate tools which are very costly, especially for large parts, and it requires much hand manipulation of the part during removal from and positioning onto the two tools. Large composite parts present particular difficulty because the part is flexible and difficult to register accurately on the tool on which it is being repositioned. When the partially fabricated part has only one skin, it is unbalanced and is often pulled out of shape by the stresses in the skin induced during cure, further exacerbating the task of repositioning the part on the BMF for trimming, and repositioning the part on the BAJ for application of the bag-side skin plies. Inexact registry of the part on the tool results in subsequent operations on the part that are out of position, since it is assumed that the part is positioned on the tool where it belongs. The part is consequently machined a little differently for each operation and the final part is never exactly the same, and the differences are never predictable. The usual quality control procedures such as statistical process control and the like are thus not effective in configuration quality control for parts made by this process. This is an increasingly serious problem in an environment wherein dimensional control and certainty of manufacturing parts within statistically determined tolerances is critical to the ability to manufacture products at rates that are important to the commercial success of the business.

Thus, there has been a serious and growing need in the industry for a process and apparatus for laying up composite and sandwich parts, such as honeycomb core parts, wherein a single tool can be used for assembly and bonding of the constituent parts of the part, and the same tool can be used for holding the part for trimming to final shape without the need for transferring the part between separate tools.

SUMMARY OF THE INVENTION

Accordingly, it is an object of this invention to provide an improved process of manufacturing bonded or cured parts from constituent elements, such as face skins or laminates, honeycomb core and resin preimpregnated fabric, that produces parts having greatly improved conformance to dimensional requirements. Another object of this invention is to provide a single tool on which constituent elements of bonded or cured parts can be assembled, bonded and/or cured, and then machined, i.e. sculpted, trimmed and/or drilled, with great precision, all while on the tool in the original position at which the part was first assembled without being removed from the tool until after machining step. Still another object of this invention is to provide an improved part assembled from constituent elements bonded or cured on a single tool and machined on that same tool in the original position at which it is bonded or cured without being removed from that position until after the final machining step.

These and other objects of the invention are attained in a single tool having a tool body with a facing surface configured to a desired shape of one surface of a part to be made on the tool. A groove in the tool body opening in its facing surface is filled with a sacrificial material that forms a top surface flush with the facing surface of the tool body. The sacrificial material is a foaming composition that forms a hard smooth skin flush with the facing surface of the tool body. Parts are made by laying a tool-side skin or laminate on the tool body and bonding the tool-side skin to the flush surface of the sacrificial material in the peripheral groove. Honeycomb core may be placed on the skin and the assembly is bonded and/or cured with the tool-side skin conforming to the surface of the tool. After curing, the tool is removed from the autoclave and repositioned on a bed of a CNC machine tool where the honeycomb core is machined to the desired shape using a suitable cutter, and the core is vacuumed to remove the dust. The plies for a bag-side skin are applied to the machined surface of the core and the assembly is cured. After cure, the tool is accurately relocated on the CNC machine tool bed and a peripheral edge is cut around the part using a cutter on the CNC machine tool. The controller of the machine tool is programmed to direct the cutter around the peripheral groove. The cutter projects into the peripheral groove and engages the full thickness of the part to cut the peripheral edge. After edge routing, the finished part is removed from the tool. The part stays on the tool for the entire manufacturing process, thereby eliminating the usual coordination problems that occur when the part was moved between tools for different manufacturing steps.

DESCRIPTION OF THE DRAWINGS

The invention and its many attendant objects and advantages will become clearer upon reading the following description of the preferred embodiment in conjunction with the following drawings, wherein:

FIG. 6 is a perspective view of another form of a tool in accordance with this invention, showing recesses in the top plate of the tool for various cutouts;

FIG. 10 is a perspective view of a vacuum tool for cleaning dust from the cells of honeycomb core elements machined on the tool shown in FIG. 1.

DESCRIPTION OF THE PREFERRED EMBODIMENT

Figure 1:
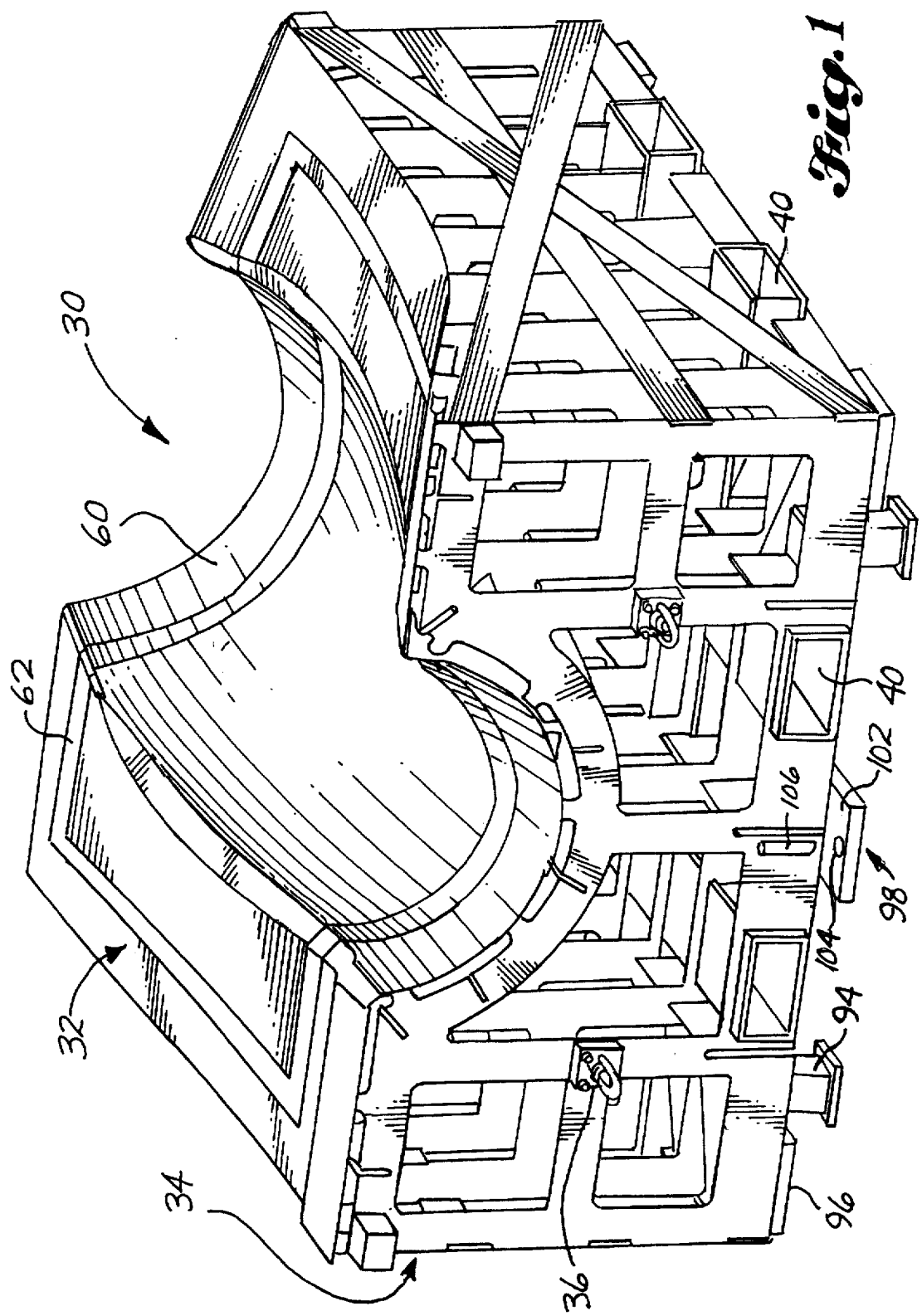
FIG. 1 is a perspective view of a dual purpose lay-up tool in accordance with this invention.

Turning to the drawings, wherein like reference numerals identify identical or corresponding elements, and more particularly to FIG. 1 thereof, a dual purpose lay-up tool 30 is shown having a tool body such as a top plate 32 supported by a support structure 34. The top plate 32 is made of a material that is compatible with the constituent materials of the part, in terms of chemical and physical properties. For example, the top plate 32 preferably should have a coefficient of thermal expansion that matches that of the constituent materials, particularly the layer placed in contact with the top plate (usually referred to as the "tool-side skin"). If the tool side skin is carbon fiber fabric preimpregnated with epoxy resin, a commonly used material, the top plate 32 could itself be carbon fiber/epoxy resin composite material, or could be Invar 36, an alloy of nickel and iron having a coefficient of thermal expansion closely matching that of carbon fiber/epoxy resin composite material. Aluminum skins with aluminum honeycomb core typically use aluminum tooling which closely match the CTE and are chemically compatible with the aluminum constituent materials.

The support structure 34 may be any suitable design, although the preferred embodiment is the conventional "egg crate" design shown in FIG. 1. Another support structure which would be suitable would be one made with composite tubes attached together with fittings shown in U.S. Pat. No. 5,100,255, the disclosure of which is incorporated herein by reference. The support structure 34 has transport accessories to facilitate movement of the tool 30 in the factory. The transport accessories in this preferred embodiment include lift rings 36 fastened two each to the front and back sides of the support structure 34 for attachment of lifting cables which are engaged with the hook of an overhead crane for lifting and ferrying the tool 30 about in the factory. Another transport accessory which can be used in place of the lift rings 36, or preferably in addition to them, are fork lift tubes 40 built into the support structure 34 as shown in FIG. 1. The fork lift tubes 40 receive the spaced tines of a fork lift by which the tool 30 may be lifted and moved about the factory.

Figure 2:
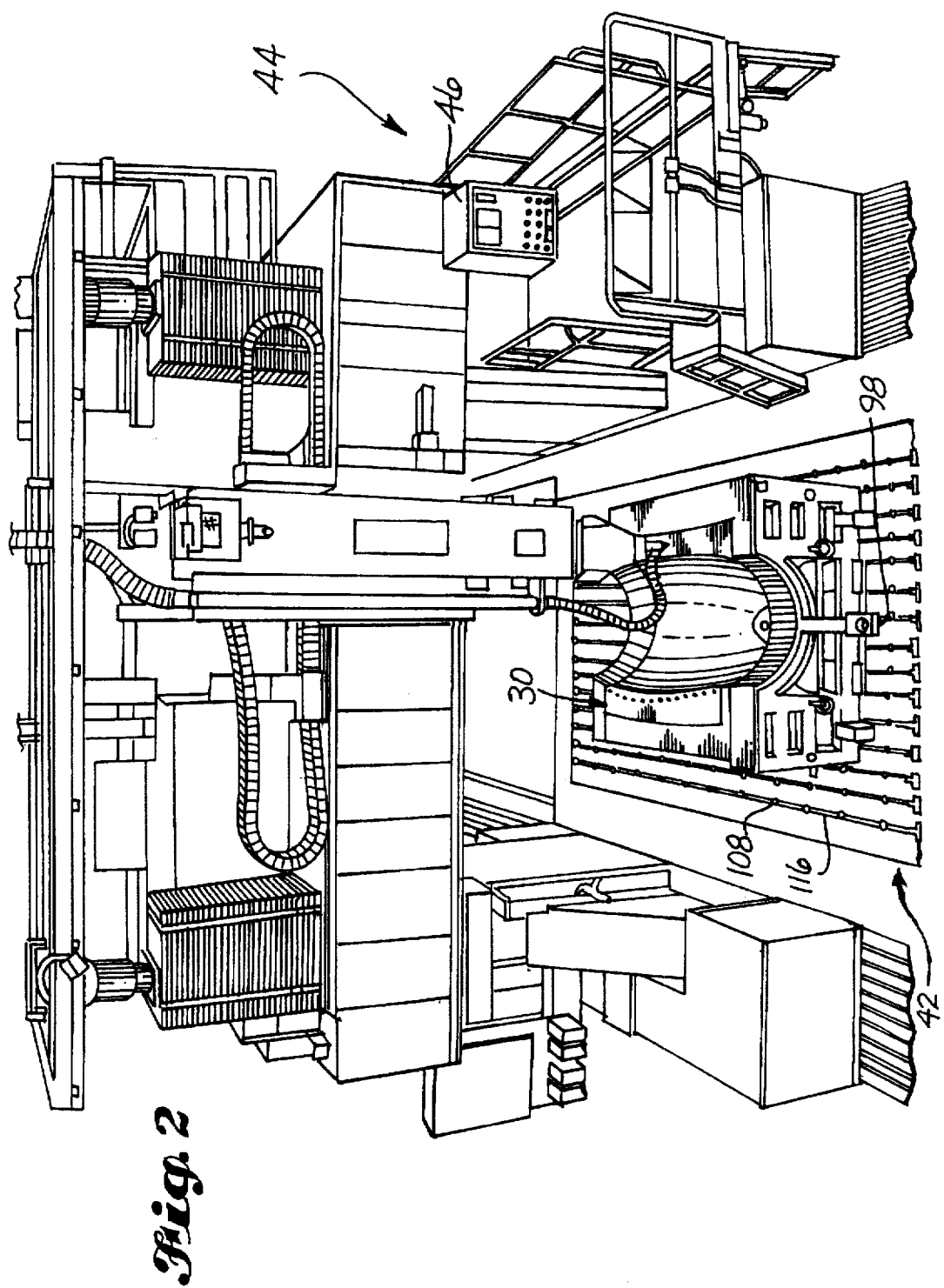
FIG. 2 is a perspective view of a dual purpose lay-up tool indexed to the base of a gantry mounted machine tool.

Location and attachment devices are provided on the support structure 34 for accurately indexing and positioning the tool 30 on a base 42 of a machine tool such as a five-axis gantry machine tool 44 shown schematically in FIG. 2, and for fastening the support structure 34 to the machine tool bed 42 in the desired position. The machine tool 44, under control by an machine tool controller 46, performs machining operations on the part laid up on the tool 30 after the part is cured. The location and attachment devices facilitate precise positioning of the tool 30 on the bed 42 so the machine tool controller can drive the machine tool to the correct position for accurate machining of the part. The location devices include set points, sine keys, and tool balls, the use of which are described in detail below. Use of these devices makes it possible to position the tool 30 on the base 42 of the machine tool with extreme accuracy and to check that position and adjust the machine program to conform to the actual position of the top plate 32 of the tool 30, thereby facilitating accuracy in the subsequent machining operations, since the position of the tool 30 and the part laid-up thereon are known accurately.

The attachment devices by which the tool 30 is secured to the machine tool bed 42 may be any conventional devices known in the art for fastening a workpiece to the bed of a machine tool. In this embodiment, the attachment devices are conventional toe clamps, the design of which is known to those skilled in the art.

The top plate 32 has an upper upwardly facing surface 60 on which the constituent elements of the part are laid-up. The upper surface 60 is configured to a desired shape of one surface of the part to be made on the tool. Upwardly opening recesses are machined into the upper surface 60 of the top plate 32 at positions corresponding to locations on the part that machining operations will be required later in the manufacturing process. The recesses include a peripheral groove 62, located on the top plate 32 where the peripheral edge of the part will be cut, and a cylindrical well 63, shown in FIG. 3, located on the top plate 32 where holes will be drilled through the part. Other continuous grooves are located within the groove 62 where openings are to be cut out of the part. Some of the various shapes of recesses are illustrated in FIG. 6. The recesses receive a sacrificial material 64 on which the constituent materials can be laid up on the top plate 32 flush with the upper surface 60.

Figure 3:
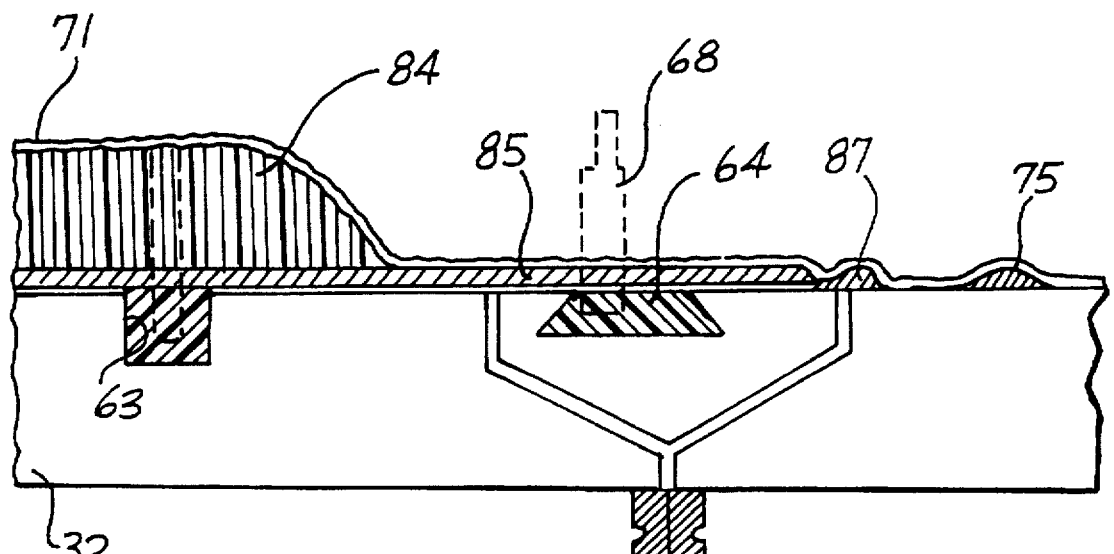
FIG. 3 is a sectional elevation of the tool face of the top plate of the tool shown in FIG. 1 with elements of a part applied and showing outlines of the cutter travel in trimming and other machining operations on the part while still mounted in the original position on the tool.

The groove 62 is preferably dovetailed in cross-section as shown in FIG. 3 which assists in retaining the sacrificial foam material in the groove until it is removed. After curing, the foam material has a strength of about 500 PSI which is sufficiently strong to provide a supporting surface that holds the tool-side plies flush with the surface of the tool top plate 32 under normal circumstances. However, if greater strength is desired, one or more plies of graphite/epoxy prepreg tape may be added in the groove 62 over the foam material 64 to provide a more rigid surface that is capable, when cured, of distributing the load over a larger surface and thereby carrying a greater load. To facilitate removal of the foam material 64 from the groove 62 after removal of the part, a separate strip of resin-impregnated fabric may be inserted into the groove 62 prior to applying the foam material therein.

The groove 62 extends completely around the central portion of the facing surface 60 of the top plate 32 on which the constituent elements of the part are to be laid up, in an area of the surface where the net edge trim will be located. Other recesses are located in areas on the tool where holes are to be drilled through the part or where other machining through the part is required. The outer peripheral groove is a "continuous" groove in the sense that it completely encircles the area on which the part is laid up. However, there may be particular part designs that require a break or a gap in the groove, hence the term "substantially continuous" groove. Preferably, the groove is just deep enough to enable a mill cutter 68 to extend below the facing surface 60 during its cutting pass so that its peripheral cutting teeth can engage and cut the full thickness of the peripheral edge of the part. The depth of the groove 62 in this embodiment is about 0.050", although it could be made deeper if the machine tool on which the cutter 68 is mounted cannot be programmed to follow the contour of the top plate 32 with the necessary precision.

The width of the groove 62 is selected to accommodate the diameter of the cutter 68 plus the necessary tolerance in the path of travel of the cutter 68 in the machine tool 44. An additional width of groove 62 is also provided on both sides of the kerf cut by the cutter 68 for holding the tool-side surface of the laid-up materials bonded to the sacrificial material 64 to ensure that the part does not shift during the cutting operation but remains securely fixed in place on the top plate 32 until the cutting operation is completed and the part is ready to be removed from the tool 30.

Figure 4:
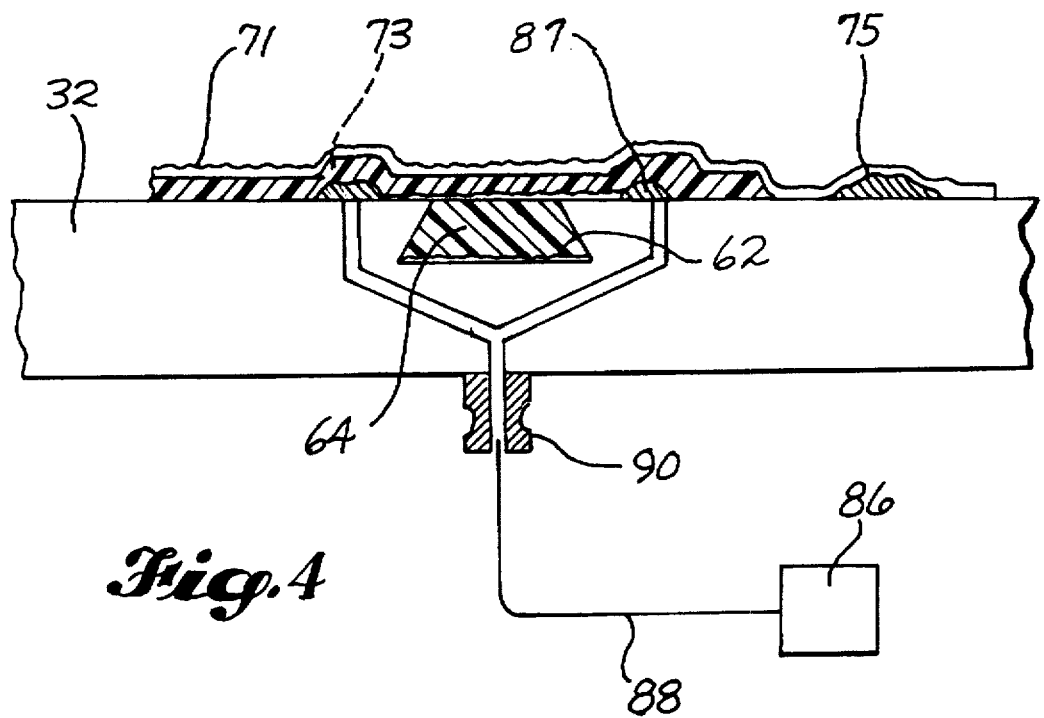
FIG. 4 is a sectional elevation of a portion of the top plate of the tool shown in FIG. 1, showing a caul sheet over the groove while the sacrificial material in the groove cures.

The sacrificial material 64 can be any suitable material that can be conveniently applied to fill the groove 62 and has sufficient strength, temperature resistance and other properties to support the constituent materials during the bonding/ curing operation. The preferred material used in this embodiment is B.F. Goodrich #PL657 heat expandable self-skinning foam. It is applied as a bead or a cut strip in the groove 62 and covered with a smooth molded caul sheet 70, as shown in FIG. 4. The caul sheet 70 is preferably a graphite/epoxy resin construction molded directly on the top surface of the top plate 32 before the groove 62 and other recesses are machined therein, and is cured thereon by heating to cure temperature for the cure cycle while covered with an evacuated vacuum bag 71. Vacuum tracks 73 may be molded into the underside of the caul sheet 70 by laying a bead of sealing tape, normally used to seal the edges of the vacuum bag 71 to the tool, along both sides of the path on which the groove 62 will be machined in the top plate surface 60. The graphite/epoxy sheets of which the caul sheet is made are laid on the tool surface 60 over the beads of tape and cure in that shape to form the vacuum tracks 73. The sacrificial material 64 is expanded and cured in the groove by covering the groove 62 with the caul sheet 70 and a vacuum bag, and sealing the edges of the vacuum bag to the facing surface 60 of the top plate 32 with putty-like sealing tape 75 known in the art for this purpose. The vacuum bag is evacuated to a vacuum of about 10 inches of vacuum and vacuum is applied in the vacuum tracks 73 to help hold the caul sheet down against the top surface 60 of the tool over the groove 62 while the foam expands against the underside of the caul sheet over the groove 62 and then cures in the expanded condition. To expand and cure the foam, the tool 30 is place in an oven or autoclave and heated to a temperature specified by the supplier of the foam material, which is about of between 260° for about 90 minutes for the B.F. Goodrich #PL657 material.

Figure 5:
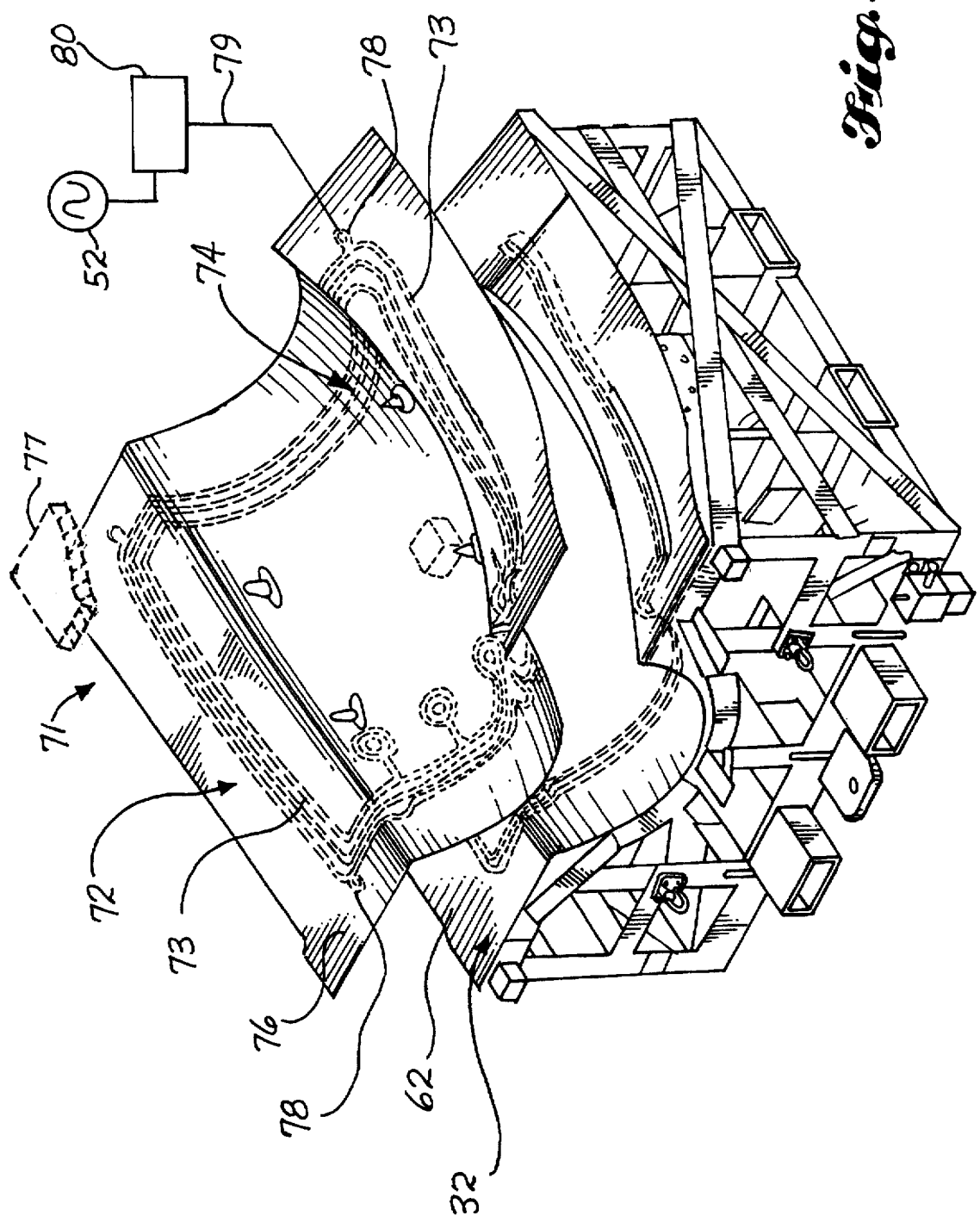
FIG. 5 is an exploded perspective view showing an electrically heated caul sheet over a tool according to this invention.

A preferred technique for curing the foam 64 uses an electrically heated caul sheet 72, shown in FIG. 5. The caul sheet 72 has an electrical heat tape 74 fastened to the top surface 76 of the caul sheet 72 in the region over the groove 62, or embedded therein when the caul sheet 72 is made. An insulating blanket 77, shown partially in phantom lines in FIG. 5, can be laid over the top of the caul sheet 72 to reduce the heat loss to the ambient air and lower the electrical power requirements to maintain an elevated temperature of the foam 64 while it cures. Temperature sensors 78 adjacent the heat tape produce signals that are transmitted over conductors 79 to a controller 80 which monitors the temperature of the caul sheet 72 and adjusts the electrical power from a power source 82 delivered to the heat tape 74 to maintain the temperature at the desired cure temperature of the foam 64 in the groove 62. The electrically heated caul sheet 72 eliminates the need to occupy an expensive oven during the foam cure cycle, thereby reducing the cost of the manufacturing process.

After the foam 64 has cured, the vacuum bag 71 and caul sheet 70 or 72 is removed and a release coating is applied to the tool face 60, on both sides of the groove 62, but is not applied to the sacrificial foam material 64 in the groove 62. The release coating ensures that the part will not adhere to the tool face when the time comes to remove it from the tool 30. The plies of the tool-side skin 85 of the part are applied to the tool face 60, overlapping the groove 62 and, as shown in FIG. 3, extending a short distance beyond the groove to provide an excess or selvage. If the part is a honeycomb core sandwich part, honeycomb core elements 84 are fit in place on top of the tool-side plies with an adhesive expanding foam between the elements 84. Conveniently, the same expanding foam material 64 used in the groove 62 may be used to bond the honeycomb elements 84 together.

A breather strip 87 is laid adjacent the tool-side plies 85 and the vacuum bag 71 is laid over the tool-side skin plies 85 and other components, such as the honeycomb core elements 84. The peripheral edge of the vacuum bag 71 is sealed to the tool face around the outside of the groove 62 with sealing tape 75 or the like, as known in the art. The space under the vacuum bag 71 and inside the periphery of the sealing puffy is evacuated by a vacuum pump 86 communicating through a vacuum line 88 with a vacuum port 90 in the tool adjacent the groove 62. Conveniently, a check valve (not shown) in the vacuum port holds the vacuum while the tool 30 is transferred into an autoclave (not shown). In the autoclave, the vacuum port 90 is reconnected to the source 86 of vacuum and the autoclave is pressurized and heated, causing the preimpregnated resin in the plies to flow and then cure while any outgassing from the curing resin is evacuated through the vacuum line 88.

After the resin in the plies and components is cured, the temperature and pressure in the autoclave is reduced to RTP and the tool 30 is transported to the machine tool bed 42.

Retractable feet 94 on the support structure 34 of the tool 30 are retracted to engage a datum surface 96 on the underside of the support structure 34 with the machine tool bed 42. This establishes the vertical position of the facing surface 60 of the tool 30 from the machine bed 42, which is a distance "known" to the machine program that controls the movement of the gantry mounted machine tool 44. The retractable feet 94 are kept extended at all other times, that is, during storage and movement of the tool 30 and during lay-up of the skin materials and constituent materials on the tool 30 to protect the accurately ground datum surface 96 from nicks or other damage that could affect the distance between the datum 96 and the top surface 60 of the top plate 32.

Figure 8:
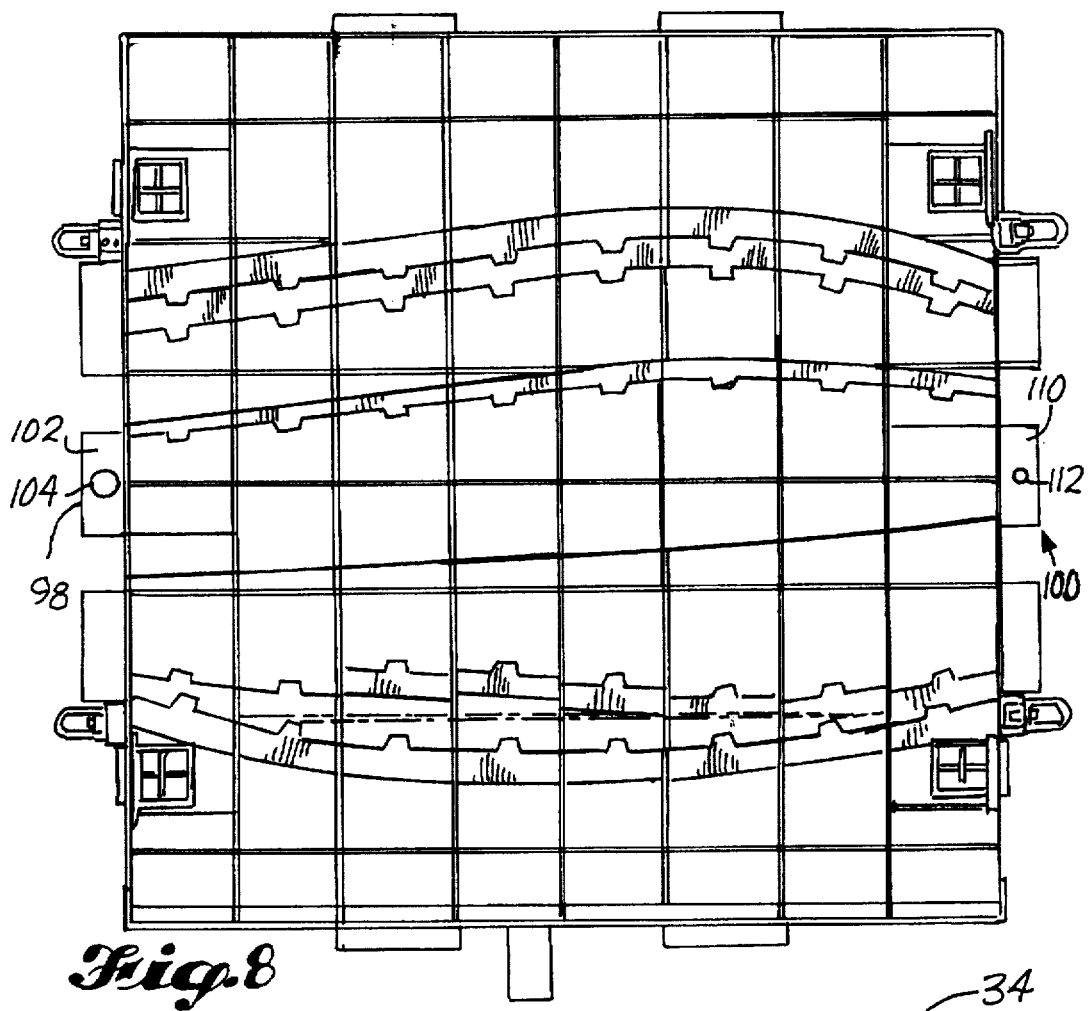
FIG. 8 is a plan view of the tool support structure shown in FIG. 7.
Figure 7:
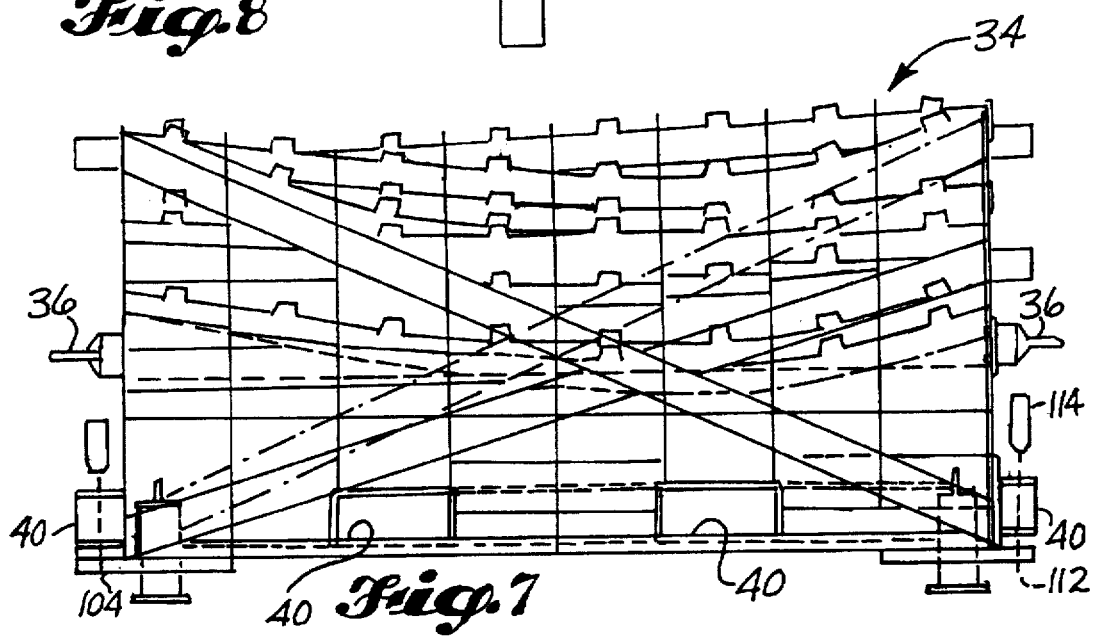
FIG. 7 is a side elevation of a support structure for a tool like the tool shown in FIG. 1.

The position and orientation of the tool 30 on the machine bed 42 are established by location devices, including a set point 98 and a sine key 100, shown in FIGS. 7 and 8. The set point 98 includes a plate 102, fixed rigidly to the underside of the support structure 34 of the tool 30 by welding or the like, and an accurately drilled and lapped vertical hole 104 in the plate 102. A precision ground pin 106, typically 2" in diameter, fits with a close sliding fit in the hole 104 and into a selected one of numerous identically sized holes 108 in the machine bed 42, shown in FIG. 2. The sine key 100, also shown in FIGS. 7 and 8, includes a plate 110 fixed, like the plate 102, to the underside of the support structure 34. A smaller vertical hole 112 is accurately drilled and lapped in the plate 110 and receives, also with a close sliding fit, an accurately ground pin 114, typically $^{13}/_{16}$" diameter, that extends down beyond the plate 110 and fits into the same T-slot 116 in the machine tool base 42 in which the hole 108 is centered. When the pins 106 and 114 are in place in the plates 102 and 110, extending down into the hole 108 and the slot 116, the position of the tool 30 is uniquely positioned on the machine tool base 42. Its position can be input to the machine tool control program by identifying the slot 116 and the hole 108 in which the pins are positioned. That information, together with a tool configuration data set and part configuration data set input into the machine tool controller 46, provides sufficient information to enable the machine tool controller to guide the machine tool to perform the required cutting operations.

Figure 9:
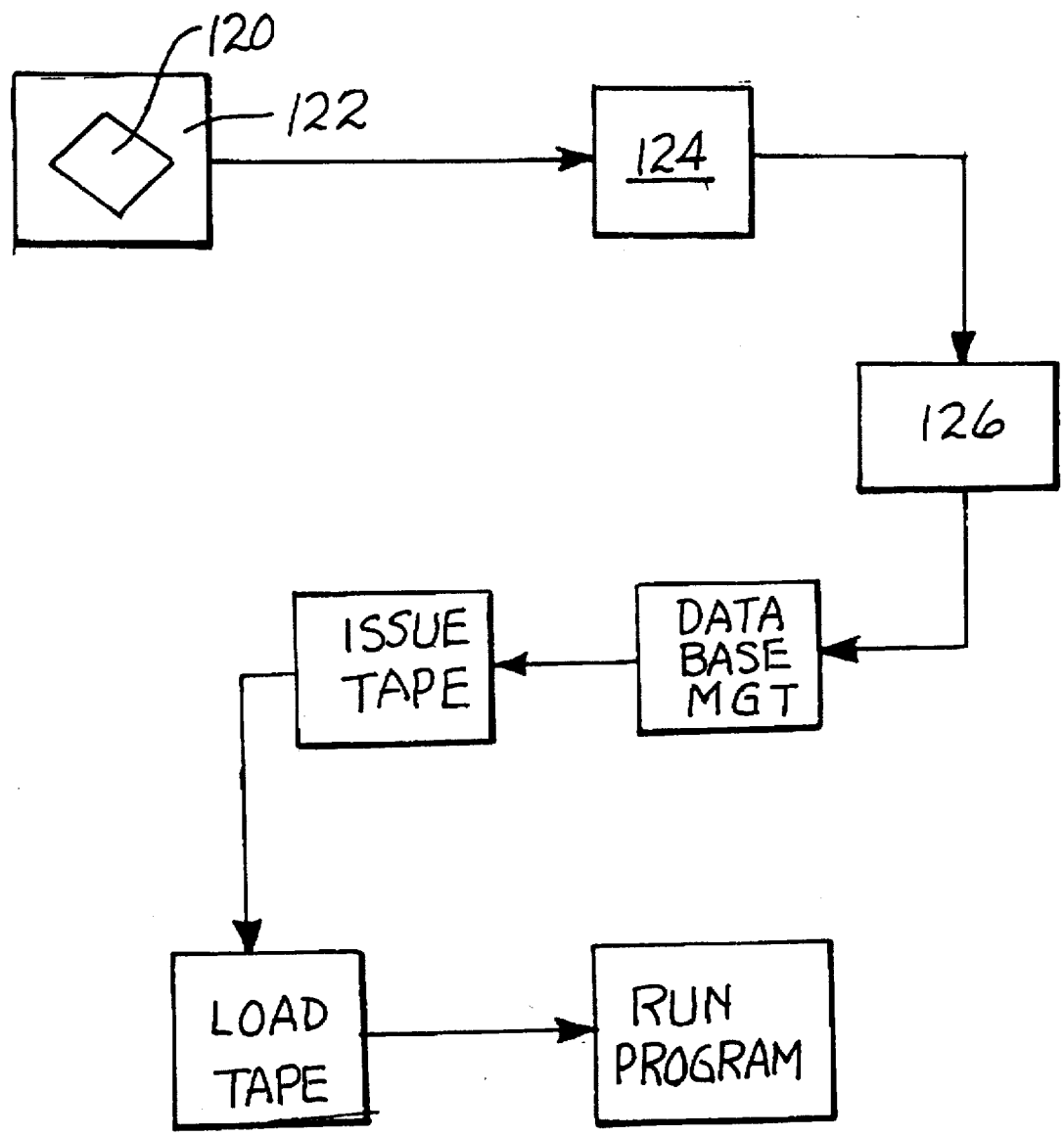
FIG. 9 is a block diagram illustrating the process of translating digital date from a digital part model to a form usable by the machine tool controller.

Turning now to FIG. 9, a process is illustrated schematically for transforming digital part data into machine instructions that can be understood and used by the controller of the machine tool 44 to enable it to perform the desired machining operations on the part such as edge routing and hole drilling. A digital part model 120 resident on a master computer 122 is provided to an NC machine programmer who produces a program 124 using the part model 120. The program contains information such as cutter type, spindle speeds, cutter feed speeds, depth of cut, number of passes and the path to be traversed by the cutter. The NC machine program is processed through a post processor 126 to produce a program in a format and medium that can be read by the machine tool controller 46. That program is logged into a data base management system for storage and retrieval when needed. The program is retrieved by the machine tool operator when he is ready to make the part. He loads it into the machine tool controller and runs the program to perform the cutting operations on the part after it is properly mounted on the machine tool base 42 and probed to confirm its position.

Some parts require that separate core assemblies be made apart from the tool-side skin and then be mated in one operation to the tool-side skin and the bag-side skin and co-cured together. For such parts, a single ply of graphite epoxy is laid on the surface 60 of the tool and the elements of honeycomb core are laid atop the tool-side ply. Strips of foam material such as the B.F. Goodrich #PL657 material are inserted between the foam core elements. A vacuum bag is laid over the assembly and evacuated with a vacuum pump. The tool is put in an autoclave and the temperature and pressure are elevated for the cure cycle. In this version of the process, it may be unnecessary to separately cure the foam in the groove 62 using a caul sheet because the honeycomb core elements lies over the groove and spans the groove, providing support to prevent the vacuum bag from dimpling the foam in the groove 62 before it can cure. After the core element has cured, the tool is taken to the machine tool and mounted on the machine tool bed 42 and indexed in place. The core element is machined to produce the sculpted shape desired for the part in which it is to used, and the periphery of the core element is cut following the peripheral groove 62 to free the core element from the tool. The sculpted and machined core element is removed and mounted on a tool-side skin in the same or another tool. A bag side skin is applied over the core element and a vacuum bag is laid over and sealed to the tool. The vacuum bag is evacuated and the tool is put in an autoclave for co-curing both skins simultaneously.

Machine the core element 84 to produce the sculpted profile desired for the part is an efficient and accurate technique for producing the desired shape of the core element. However, removing dust and debris from the core cells after machining has proven difficult, especially when the part remains affixed to the tool until the bag-side skin is cured. To facilitate removal of dust and debris from the core cells, a vacuum tool 130, shown in FIG. 10, is slip over the top surface of the core element. The vacuum tool has a hood 132 having a fitting 134 to which a vacuum hose 136 is attached. A pipe 138 is mounted in opposite sides of the hood 132 transverse across its opening. The pipe has a row of small holes 140 oriented toward the opening of the hood and has a quick disconnect coupling 142 at its end for attachment to an air pressure hose 144.

In operation, the vacuum tool is connected to a vacuum hose 136 from a source of vacuum, such as a shop vacuum cleaner, and an air hose 144 is connected to the coupling 142. The hood is placed with its opening on the surface of the honeycomb core and the air blowing through the row of holes 140 blows the dust out of the honeycomb cells and the vacuum dusty air is withdrawn from the hood 132 through the vacuum hose 136. The rate of air blown through the holes 140 is less that the rate of air sucked out of the vacuum hood 132 by the vacuum source, so no dust is blown out of the hood 132. A set of shallow notches 146 along the leading edge of the hood 132 allows air to be sucked into the hood and prevents a vacuum condition from building up inside the hood, which could make it difficult to move the hood about over the surface of the core element 84.

Thus, the invention meets the objects noted above by providing a method and apparatus for laying-up and curing/bonding the parts on a lay-up tool, and providing the means for sculpting honeycomb core and trimming and drilling the part while it is still on the original tool and still in the original position. All the registry problems in the prior art process and apparatus are removed by this invention, resulting in substantially improved manufacturing conformance to specified tolerances, and the cost of building, maintaining and storing the tooling is reduced significantly. The improved capability of small tolerance manufacturing makes possible, for the first time, use of modern manufacturing techniques with these large laid-up parts, such as statistical tolerancing and determinant assembly, thereby further improving the quality and reducing the cost of the assemblies in which the parts are used.

Obviously, numerous modifications and variations of this preferred embodiment will occur to those skilled in the art in light of this disclosure. Accordingly, it is expressly to be understood that these modifications and variation, and the equivalents thereof, shall be considered to be within the spirit and scope of the invention as defined in the following claims, wherein I claim:

1. A dual purpose tool serving both as a form on which constituent materials are applied for bonding or curing on said tool into a part in a desired configuration, and for holding said materials in the originally applied position during subsequent machining of a peripheral edge of said part after said constituent materials have bonded or cured on said tool, comprising:

a tool body having a facing surface configured to a desired shape of one surface of a part to be made on said tool;

a supporting structure for supporting said tool body to maintain said facing surface in said desired shape;

a substantially continuous groove in said tool body opening in said facing surface into which a cutting tool extends while edge trimming said peripheral edge of said part;

a sacrificial material filling said groove and having a top surface substantially flush with said tool body facing surface for supporting said constituent materials substantially flush with said tool body facing surface during bonding or curing;

whereby said constituent materials for said part are applied on said tool body, bonded or cured, and then edge trimmed thereon with said cutting tool which extends into said groove, cutting into said sacrificial material and engaging the full thickness of said part, all while said materials for said part remain on said tool body in said originally applied position.

2. A dual purpose tool as defined in claim 1, wherein:

said groove is dovetail in cross-section shape on a plane perpendicular to a longitudinal axis of said groove, said groove having a bottom width wider than the width at said facing surface.

3. A dual purpose tool as defined in claim 1, wherein:

said sacrificial material is a self-skinning foaming composition forming a dense hard skin flush with said facing surface of said tool body.

4. A dual purpose tool as defined in claim 1, wherein:

said sacrificial material has bonded therein a strip of fiber to facilitate removal of said sacrificial material from said groove after said peripheral edge is cut around said part.

5. A dual purpose tool as defined in claim 1, further comprising:

location devices on said tool for accurately positioning said supporting structure and said tool body on a bed of a machine tool, whereby said machine tool may be programmed with configuration data regarding said groove and with location data regarding said supporting structure and tool body position for automatic cutting of said peripheral edge by said machine tool.

6. A dual purpose tool as defined in claim 5, wherein:

said location devices include a set point and a sine key, each having accurately positioned pins for accurately positioning said supporting structure on said machine tool bed.

7. A dual purpose tool as defined in claim 6, wherein:

said location devices include a tool ball socket in said tool body for receiving a tool ball, said tool ball having a surface for engaging a probe operated by said machine tool to locate the actual position of reference surfaces on said tool.

8. A laid-up and bonded part, comprising:

a tool-side skin and a bag-side skin bonded to opposite sides of a honeycomb core element while on a facing surface of a dual-purpose tool configured to a desired shape of one surface of said part, said tool-side skin lying over a substantially continuous groove in said tool, opening in said facing surface, and being supported thereon by a sacrificial material filling said groove;

a peripheral edge around said part machined, while said part was in its original laid-up position on said tool, with a cutting tool extending into said substantially continuous groove and cutting said sacrificial material while engaging the full thickness of said part.

9. A method of manufacturing a laid-up, bonded and, cured composite part, comprising:

filling a peripheral groove on a facing surface of a tool with a sacrificial material and forming a surface thereon flush with said facing surface;

laying-up a tool-side skin on said facing surface of said tool and laying-up other components of said part on top of said tool-side skin, said skin and components having an adhesive/resin matrix which bonds/cures to create a rigid integral assembly of said skin and components;

applying a vacuum bag over said laid-up skin and components and sealing peripheral regions of said vacuum bag around said laid-up skin and components;

evacuating air from under said vacuum bag to cause air pressure outside said vacuum bag to press said vacuum bag against said components;

bonding/curing said adhesive/resin matrix to transform said skin and components into said rigid integral assembly;

removing said vacuum bag from said facing surface of said tool, uncovering said rigid integral assembly;

fixing said tool in a known position on a CNC machine tool bed using location devices to position said facing surface of said tool at a known position for edge routing of said rigid integral assembly by a machine tool;

loading a data set, having a digital definition of said part, into a controller for controlling operation of said machine tool;

guiding a cutter of said machine tool, with said controller operating a machine control program incorporating said data set, on a predetermined path around said facing surface of said tool, with said cutter cutting in said sacrificial material in said below said facing surface of said tool and cutting a peripheral edge around said rigid integral assembly;

removing said rigid integral assembly from said facing surface of said tool.

10. A method of manufacturing as defined in claim 9, further comprising:

probing said tool with a probe mounted on said CNC machine tool to establish actual positions of at least three reference positions on said tool; and normalizing said machine control program with said actual positions of said reference points to update data in said machine control program about said position of said tool on said machine bed from position data in said controller based on coordinates of said location devices.

11. A method of manufacturing as defined in claim 9, wherein:

said data set is downloaded to said machine program in said machine tool controller from a main computer in which said data set resides.

12. A method of manufacturing as defined in claim 9, wherein:

said groove is cut using said machine tool with said tool on said machine bed to minimize variations between different machine tools.

13. A method of manufacturing as defined in claim 11, wherein:

said sacrificial material is a foaming, self-skinning material; and said sacrificial material surface forming step includes covering said facing surface of said tool with a caul sheet, and heating said tool and said foaming material in said groove to foam and cure said foaming material, filling said groove and forming a hard, smooth surface on said foam flush with said facing surface.

14. A method of manufacturing laid-up bonded or cured parts, comprising:

laying a tool-side face sheet in an original laid-up position on a tool having a facing surface configured with a desired mold line configuration of said part;

supporting said tool-side face sheet on a sacrificial material filling a peripheral groove around said face sheet inboard of an outer peripheral edge thereof, said sacrificial material having an upper surface flush with said facing surface of said tool;

bonding said tool-side face sheet to said sacrificial material in said peripheral groove;

bonding or curing said face sheet on said tool; and with said tool-side face sheet still in said original laid-up position, cutting a new peripheral edge on said part with a cutter on a machine following said peripheral groove, said cutter extending into said peripheral groove, cutting partially into said sacrificial material, and engaging the full thickness of said face sheet to cut said new peripheral edge.

15. A method of manufacturing laid-up bonded or cured parts as defined in claim 14, further comprising:

laying up honeycomb core materials on top of said tool side face sheet and bonding said honeycomb materials to said tool-side face sheet; and machining said honeycomb materials to produce a honeycomb core with a sculpted top surface having a profile conforming to a desired profile of said part; and bonding a bag-side skin to said sculpted top surface of said honeycomb core.

16. A method of manufacturing laid-up bonded or cured parts as defined in claim 15, further comprising:

blowing air in cells of said honeycomb core after machining and while said tool side face sheet and honeycomb core materials are still in said original laid-up position to entrain dust created during said machining of said honeycomb, and applying vacuum suction in the vicinity of said blowing to evacuate dusty air blown out of said cells.

17. A method of manufacturing laid-up bonded or cured parts as defined in claim 14, wherein:

said sacrificial material is a foaming, self-skinning material; and said sacrificial material surface forming step includes covering said facing surface of said tool with a caul sheet, and heating said tool and said foaming material in said groove to foam and cure said foaming material, filling said groove and forming a hard, smooth surface on said foam flush with said facing surface.

18. A method of fabricating composite parts, comprising:

applying a bead of a foaming material in a substantially continuous groove around a lay-up area of a top surface of a tool;

laying a caul plate over said groove and applying pressure to hold said caul plate flat against said top surface of said tool;

heating said caul plate and thereby heating said foaming material in said groove;

allowing said foaming material to foam and fill said groove up to said caul plate to produce a top surface of said foam material that is flush with said top surface of said tool;

allowing said foam material to cure in place in said groove while maintaining said pressure on said caul plate;

removing said caul plate after said foam material has cured;

laying up component elements of said part in an original laid-up position and curing said elements in place in said original laid-up position on said tool without removing said elements from said tool;

locating a reference surface of said tool on a machine tool bed and positioning said tool accurately on said machine tool bed so that the position of said groove is known accurately;

programming a machine tool controller of said machine tool with a path of travel along with said groove:

directing said machine tool with said machine tool controller to drive a cutter around said part in said groove with said cutter engaging and cutting the full thickness of said part without removing said elements from said original laid-up position on said tool to provide an accurate edge trim of said part; and removing said part from said tool.

19. A method of fabricating composite parts as defined in claim 18, wherein:

said caul plate heating step, during curing of said foam, includes electrically energizing electrical heater elements in contact with said caul plate.

20. A method of fabricating composite parts as defined in claim 18, further comprising:

adhering said laid-up elements to said foam.

21. A method of fabricating composite parts as defined in claim 18, wherein:

said groove has a longitudinal axis and is dovetailed in cross-section normal to said longitudinal axis of said groove.

22. A method of fabricating composite parts as defined in claim 21, further comprising:

applying a release agent to said groove prior to applying said bead of said foaming material therein.

23. A method of fabricating composite parts as defined in claim 18, wherein:

said component elements of said part include a tool-side face sheet laid on said lay-up area of said tool, and a honeycomb core having cells oriented normal to said top surface of said tool;

said programming step further comprises programming said machine tool controller of said machine tool to direct said machine tool to drive a cutter over a top surface of said honeycomb core to sculpt said honeycomb core to a desired shape while said honeycomb core remains bonded to said tool-side face sheet and while still in place in said original laid-up position.

24. A method of fabricating composite parts as defined in claim 23, further comprising:
cleaning said cells of said honeycomb core by passing a suction hood over open ends of said cells and simultaneously blowing jets of air into said cells while evacuating said hood to remove dust blown out of said cells by said jets of air.

25. A method of fabricating composite parts as defined in claim 22, further comprising:
inserting a strip of fabric in said groove prior to applying said release agent to said groove and prior to applying said bead of said foaming material therein.

* * * * *